United States Patent
Lin

(10) Patent No.: US 8,562,151 B2
(45) Date of Patent: Oct. 22, 2013

(54) DISPLAY DEVICE COMPRISING ROTATING PROJECTORS WITH MULTIPLE MIRRORS AND PANELS

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 398 days.

(21) Appl. No.: 12/949,799

(22) Filed: Nov. 19, 2010

(65) Prior Publication Data

US 2012/0050699 A1    Mar. 1, 2012

(30) Foreign Application Priority Data

Aug. 30, 2010 (TW) .............................. 99129152 A

(51) Int. Cl.
*G03B 21/26* (2006.01)
*G03B 21/28* (2006.01)

(52) U.S. Cl.
USPC .............................................. 353/94; 353/99

(58) Field of Classification Search
USPC ........... 353/99, 98, 37, 94, 122, 50, 51, 7, 10, 353/30, 31, 119; 359/201.2, 204.2, 212.1, 359/216.1, 219.1, 451, 462, 478; 352/69; 348/46, 51, 36, 37, 38, 39; 250/208.1, 250/216, 234, 235, 239
See application file for complete search history.

(56) References Cited

U.S. PATENT DOCUMENTS

| | | | | | |
|---|---|---|---|---|---|
| 1,514,138 | A | * | 11/1924 | Dahl | 353/30 |
| 2,339,822 | A | * | 1/1944 | Van Blaricon et al. | 353/7 |
| 2,592,444 | A | * | 4/1952 | Matelena | 353/13 |
| 3,542,948 | A | * | 11/1970 | Wolff | 348/38 |
| 3,758,714 | A | * | 9/1973 | Herndon | 348/38 |
| 5,678,910 | A | * | 10/1997 | Martin | 353/7 |
| 6,056,406 | A | * | 5/2000 | Park | 353/94 |
| 6,871,958 | B2 | * | 3/2005 | Streid et al. | 353/37 |
| 7,059,729 | B2 | * | 6/2006 | Hoshino et al. | 353/94 |
| 7,604,354 | B1 | * | 10/2009 | Ligon | 353/30 |
| 2011/0102745 | A1 | * | 5/2011 | Cheng et al. | 353/10 |

* cited by examiner

*Primary Examiner* — Que T Le
*Assistant Examiner* — Jennifer Bennett
(74) *Attorney, Agent, or Firm* — Altis & Wispro Law Group, Inc.

(57) ABSTRACT

A display device includes a projector assembly, an actuator, a panel element, and a number of mirrors. The projector assembly projects lights of an image. The actuator rotates the projector assembly about a rotating axis. The panel element includes a number of panel surfaces. The panel surfaces adjoin one another in sequence along the rotating axis. The mirrors are arranged in sequence along the rotating axis. The mirrors are oriented toward the respective panel surfaces for adjusting transmission directions of the lights to project the image onto the respective panel surfaces.

8 Claims, 3 Drawing Sheets

DISPLAY DEVICE COMPRISING ROTATING PROJECTORS WITH MULTIPLE MIRRORS AND PANELS

BACKGROUND

1. Technical Field

The disclosure generally relates to display devices and, particularly, to a display device with a panel element.

2. Description of Related Art

Flat panel displays (FPDs) such as liquid crystal displays (LCDs) are widely used to display images. However, the images of a typical flat panel display can only be observed within a limited viewing angle less than 160 degrees. A user out of the viewing angle cannot observe the images. Such characteristics quite limit applications of the flat panel displays.

Therefore, what is needed, is a display device, which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The embodiment of the display device will now be described in detail below and with reference to the drawings.

Figure 1:
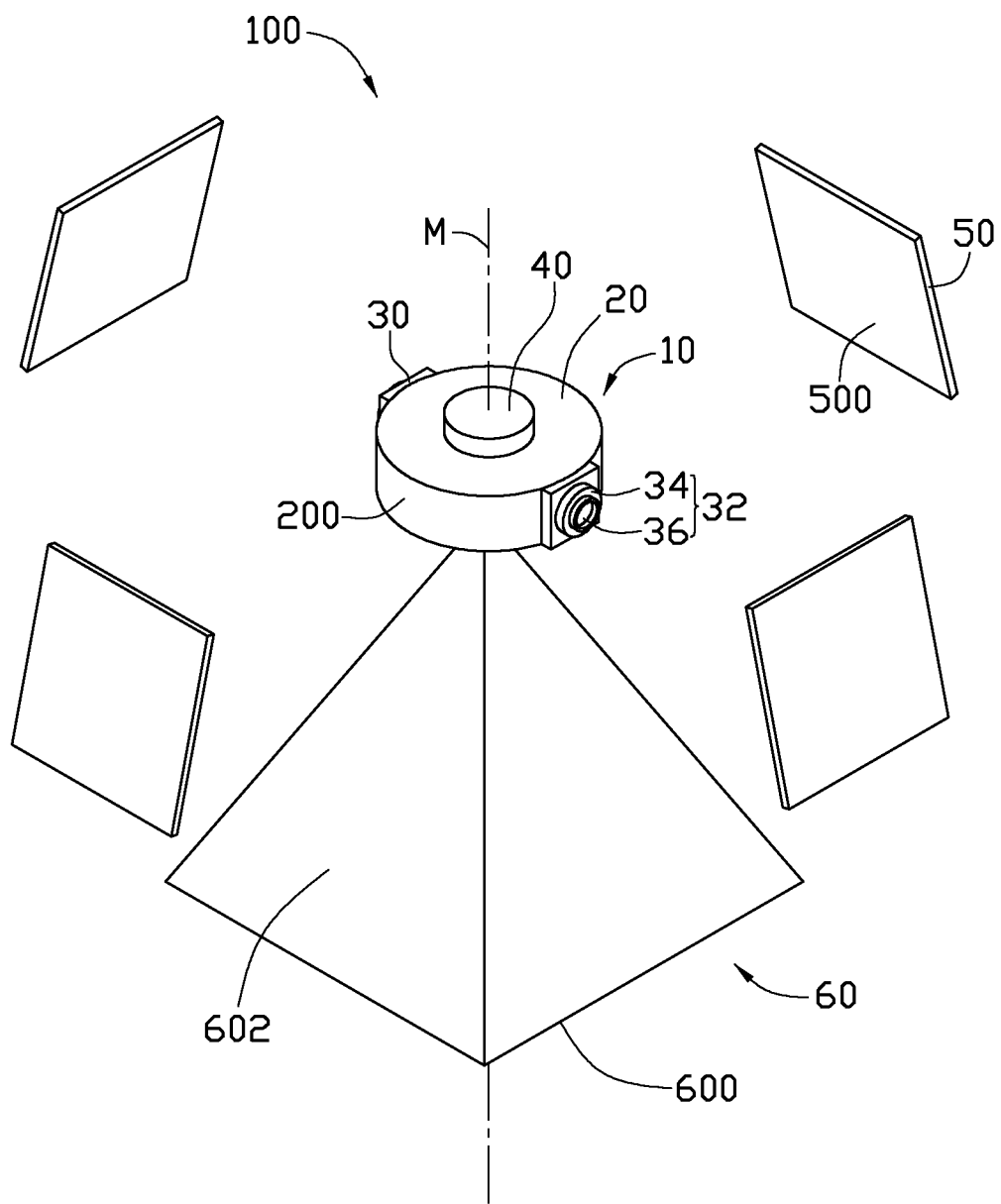
FIG. 1 is an isometric view of a display device in accordance with an exemplary embodiment.

Referring to FIG. 1, a display device 100 in accordance with an exemplary embodiment is shown. The display device 100 includes a projector assembly 10, an actuator 40, a number of mirrors 50, and a panel element 60.

The projector assembly 10 includes a main body 20, a first projector 30, and a second projector 32. The main body 20 is a chamber with a cavity defined therein. In this embodiment, the main body 20 is substantially cylindrical, and includes a cylindrical sidewall 200. The first projector 30 and the second projector 32 are attached to two opposite sides of the main body 20. An end of each of the first and the second projectors 30 and 32 is received in the main body 20. An opposite end of each of the first and the second projectors 30 and 32 protrudes from the sidewall 200. In this embodiment, each of the first and second projectors 30 and 32 includes a lens barrel 34 and at least one lens 36 received in the lens barrel 34. The first and second projectors 30 and 32 are aligned along a line substantially perpendicular to a central axis of the main body 20. The lens 36 of the first projector 30 is coaxially aligned with the lens 36 of the second projector 32. In alternative embodiments, the projector assembly 10 may include only a first projector 30 (or a second projector 32), or the projector assembly 10 may include more than two projectors, such as four projectors. The number of the projectors should not be limited to the above illustrated embodiments.

The actuator 40 rotates the projector assembly 10 about a rotating axis M. The rotating axis M is coaxially aligned with the central axis of the main body 20. The actuator 40 can be a motor coupled to the main body 20. In use, the actuator 40 rotates the main body 20 and the first and second projectors 30 and 32 about the rotating axis M. In this embodiment, the first and the second projectors 30 and 32 are rotated at a high speed of 3600 rotations per minute (RPM) or more than 3600 RPM.

Figure 2:
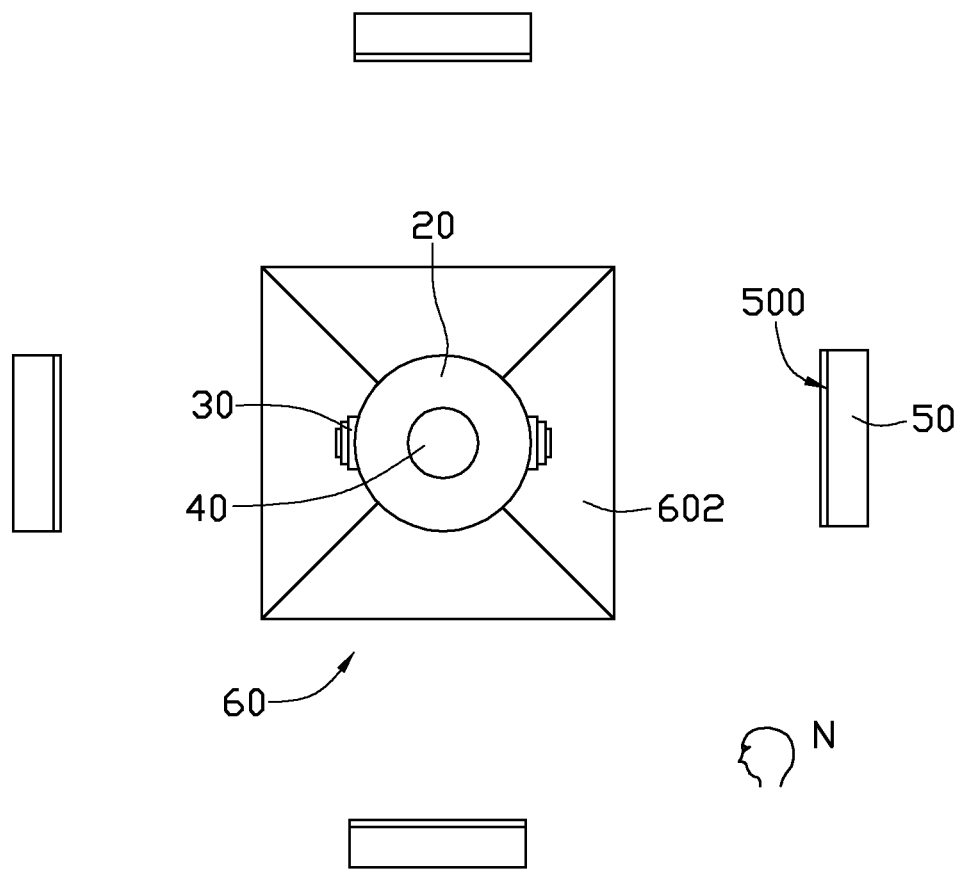
FIG. 2 is a top plan view of the display device of FIG. 1.
Figure 3:
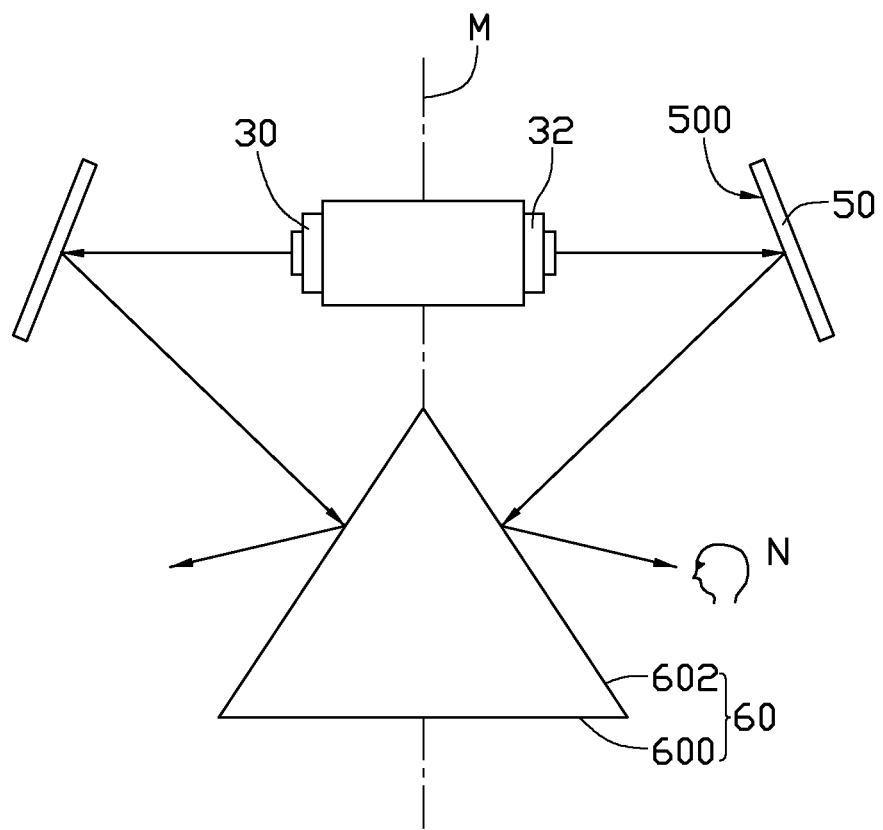
FIG. 3 is a schematic view of the display device of FIG. 1, showing light path of the display device.

As shown in FIG. 2 and FIG. 3, the mirrors 50 are arranged in sequence along the rotating axis M. In this embodiment, the display device 100 includes four mirrors 50, and the four mirrors 50 are equidistantly arranged around the rotating axis M. In addition, the mirrors 50 are located on a common plane substantially perpendicular to the rotating axis M. Each of the mirrors 50 is rectangular plate-shaped, and includes a reflecting surface 500 oriented toward the projector assembly 10. Each reflecting surface 500 is a rectangular flat surface, and is slanted toward the rotating axis M.

The panel element 60 is arranged below/under the projector assembly 10. In this embodiment, the panel element 60 is rectangular prismoid-shaped, and includes a bottom surface 600 and four panel surfaces 602. A central axis of the panel element 60 is coaxially aligned with the rotating axis M. The bottom surface 600 is located at a side of the panel element 60 facing away from the projector assembly 10. The four panel surfaces 602 adjoin one another in sequence along the rotating axis M. Each of the panel surfaces 602 adjoins the bottom surface 600, and is slanted toward the rotating axis M, as shown in FIG. 3.

In alternative embodiments, the panel element 60 may have another suitable shape. For example, the panel element 60 may be hexagonal prismoid-shaped, or the panel element 60 may be prism-shaped. The number of the reflecting surfaces 500 is equal to that of the panel surfaces 602. For example, when the panel element 60 is hexagonal prismoid-shaped, the display device 100 includes five reflecting surfaces 500. In other alternative embodiments, the number of the reflecting surfaces 500 is not necessarily equal to that of the panel surfaces 602, and can be less or greater than the number of the panel surfaces 602. In yet other alternative embodiments, the reflecting surface 500 may have other suitable shapes. For example, the reflecting surface 500 may be round or elliptical.

The four panel surfaces 602 are oriented toward four respective reflecting surfaces 500. In operation, the first and the second projectors 30 and 32 project light of a same image in two opposite directions. When the actuator 40 rotates the first and the second projectors 30 and 32 at a high speed. Each of the four reflecting surfaces 500 reflects light from the first and the second projectors 30 and 32 in sequence to the corresponding panel surface 602, thus projecting the image onto the panel surface 602.

As the first and the second projectors 30 and 32 rotate at a high speed, visual staying phenomenon (or duration of vision) occurs, the image of the first and the second projectors 30 and 32 can be observed at different perspectives and from different locations around the panel element 60.

The display device 100 can be used in application where a user can view the image at different locations around the panel element 60. In one example as shown in FIG. 2, when the user is located near a junction of two neighboring panel surfaces 602, the user can view the image from both of the two neighboring panel surfaces 602. In another example as shown in FIG. 3, when the user is located in front of one of the panel surfaces 602, the user can view the image from the corresponding panel surface 602.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A display device comprising:
 a projector assembly comprising a main body, a first projector and a second projector, the first projector and the second projector attached to opposite sides of the main body, each of the first and second projectors comprising a lens barrel and at least one lens received in the lens barrel, the first and second projectors aligned along a line substantially perpendicular to a central axis of the main body, the lens of the first projector being coaxially aligned with the second projector, the first and second projectors configured for projecting light of a same image in two opposite directions of the line away from the central axis of the main body;
 an actuator coupled to main body configured for rotating the main body and the projector assembly about a rotating axis coaxially aligned with the central axis of the main body;
 a panel element arranged under the projector assembly, the panel element comprising a plurality of panel surfaces, the panel surfaces adjoining one another in sequence along the rotating axis; and
 a plurality of mirrors arranged in sequence along the rotating axis, the mirrors being oriented toward the respective panel surfaces and oriented toward the projector assembly for reflecting the light projected by the first and second projectors in sequence to the corresponding panel surface so as to project the image onto the respective panel surfaces.

2. The display device of claim 1, the main body is cylinder-shaped.

3. The display device of claim 1, wherein the panel element is rectangular prismoid-shaped, and the panel element comprises four panel surfaces, the four panel surfaces adjoining one another in sequence along the rotating axis, the plurality of mirrors comprises four mirrors.

4. The display device of claim 3, wherein the mirrors are located on a common plane substantially perpendicular to the rotating axis.

5. The display device of claim 1, wherein each of the mirrors is rectangular plate-shaped.

6. The display device of claim 1, wherein the actuator comprises a motor.

7. The display device of claim 1, wherein the actuator rotates the projector assembly at a rotation speed of 360° rotations per minute or more than 360° rotations per minute.

8. The display device of claim 3, wherein a central axis of the panel element is coaxially aligned with the rotating axis, and each of the panel surfaces is slanted relative to the rotating axis.

* * * * *